(12) United States Patent
Dextreit

(10) Patent No.: US 10,046,650 B2
(45) Date of Patent: Aug. 14, 2018

(54) CONTROL MEANS AND METHOD FOR CHARGING A VEHICLE

(71) Applicant: Jaguar Land Rover Limited, Coventry (GB)

(72) Inventor: Clement Dextreit, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 167 days.

(21) Appl. No.: 14/419,261

(22) PCT Filed: Aug. 6, 2013

(86) PCT No.: PCT/EP2013/066510
§ 371 (c)(1),
(2) Date: Feb. 3, 2015

(87) PCT Pub. No.: WO2014/023747
PCT Pub. Date: Feb. 13, 2014

(65) Prior Publication Data
US 2015/0175019 A1 Jun. 25, 2015

(30) Foreign Application Priority Data
Aug. 6, 2012 (GB) .................................. 1213918.4

(51) Int. Cl.
*H02J 7/00* (2006.01)
*B60L 11/18* (2006.01)

(52) U.S. Cl.
CPC ......... *B60L 11/1809* (2013.01); *B60L 11/184* (2013.01); *B60L 11/1818* (2013.01);
(Continued)

(58) Field of Classification Search
CPC .................... B60L 11/184; B60L 11/1809; B60L 11/1846; B60L 2240/60; B60L 2240/72; Y02T 10/7088; Y02T 90/168
(Continued)

(56) References Cited

U.S. PATENT DOCUMENTS

| 2010/0174667 A1 | 7/2010 | Vitale et al. |
| 2011/0213520 A1 | 9/2011 | Yaguchi et al. |

(Continued)

FOREIGN PATENT DOCUMENTS

| CA | 2 648 972 A1 | 6/2009 |
| WO | WO 2012/046269 A1 | 4/2012 |

OTHER PUBLICATIONS

International Search Report, PCT/EP2013/066510, dated Sep. 23, 2014, 4 pages.
(Continued)

*Primary Examiner* — Edward Tso
*Assistant Examiner* — Aaron Piggush
(74) *Attorney, Agent, or Firm* — Myers Bigel, P.A.

(57) ABSTRACT

Embodiments of the present invention provide control means for a vehicle, the control means being operable to control charging of tractive energy storage means of the vehicle, the control means being configured to allow charging of the energy storage means in dependence on a location of the vehicle and a time of day, wherein if the location of the vehicle corresponds to one or more prescribed locations the control means is operable to permit charging only during one or more prescribed periods of the day.

17 Claims, 2 Drawing Sheets

(52) U.S. Cl.
CPC ....... *B60L 11/1825* (2013.01); *B60L 11/1844* (2013.01); *B60L 11/1846* (2013.01); *B60L 2230/40* (2013.01); *B60L 2240/622* (2013.01); *B60L 2240/625* (2013.01); *B60L 2240/70* (2013.01); *B60L 2250/14* (2013.01); *B60L 2260/58* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
USPC .......................... 320/104, 109, 155; 701/22
See application file for complete search history.

(56) References Cited

U.S. PATENT DOCUMENTS

| | | | |
|---|---|---|---|
| 2012/0049793 A1* | 3/2012 | Ross | H01M 10/44 320/109 |
| 2012/0109409 A1* | 5/2012 | Hara | B60L 11/1818 701/1 |

OTHER PUBLICATIONS

Combined Search and Examination Report, Application No. GB1213918.4, dated Nov. 29, 2012, 4 pages.

* cited by examiner

CONTROL MEANS AND METHOD FOR CHARGING A VEHICLE

RELATED APPLICATIONS

This application is a 35 U.S.C. § 371national stage application of PCT Application No. PCT/EP2013/066510, filed on Aug. 6, 2013, which claims priority from Great Britain Patent Application No. 1213918.4, filed on Aug. 6, 2012, the contents of which are incorporated herein by reference in their entireties. The above-referenced PCT International Application was published in the English language as International Publication No. WO 2014/023747 A2 on Feb. 13, 2014.

FIELD OF THE INVENTION

The present invention relates to charging of energy storage means of a motor vehicle. In particular but not exclusively the present invention relates to control means for controlling charging of energy storage devices for powering propulsion motors in so-called plug-in electric vehicles and hybrid electric vehicles, and to a corresponding method.

BACKGROUND

It is known to provide a plug-in electric vehicle (PEV) or plug-in hybrid electric vehicle (PHEV) having a battery that may be charged when the vehicle is connected to a charging station. Charging stations are typically provided with a cable and charging plug which may be connected to a corresponding socket of the vehicle. In some countries, the cost of a given unit of electricity depends on the time of day, the cost being higher at certain times of day (such as during normal working hours) compared with other times. It is desirable to take advantage of reduced electricity costs where possible in order to reduce an overall running cost of a PEV or PHEV.

STATEMENT OF THE INVENTION

Embodiments of the invention may be understood with reference to the appended claims.

Aspects of the present invention provide an apparatus, a vehicle and a method.

In one aspect of the invention for which protection is sought there is provided control means for a vehicle, the control means being operable to control charging of tractive energy storage means of the vehicle for powering one or more electric propulsion motors, the control means being configured to allow charging of the energy storage means in dependence on a location of the vehicle and a time of day, wherein if the location of the vehicle corresponds to one or more prescribed locations the control means is operable to perform charging during one or more prescribed periods of the day.

It may be that the controller is operable to permit charging only during one or more prescribed periods of the day.

The control means may comprise a control unit or controller, for example in the form of a processor, microcontroller or electronic control module (ECU).

Advantageously the control means may be arranged wherein if the location of the vehicle does not correspond to one or more prescribed locations the control means is operable to perform charging irrespective of the time of day.

The control means may be operable to allow a user manually to input data corresponding to an identity of the one or more prescribed periods of the day when charging may be performed at the one or more prescribed locations.

The control means may be operable to access data corresponding to an identity of the one or more prescribed periods of the day when charging may be performed at the one or more prescribed locations.

The control means may be arranged to access data in respect of the one or more times of day during which charging may be performed via one selected from amongst a wireless internet connection, a mobile telecommunications network and a portable data storage device.

The control means may be arranged to receive data indicative of a location of the vehicle.

Optionally the control means comprises means for determining a location of the vehicle.

Advantageously the control means may be operable to charge the energy storage means to a prescribed value of state of charge over one or more time periods determined responsive to data in respect of an expected departure time of the vehicle, the control means being configured to optimise charging to the prescribed value by charging the energy storage means for as long as possible during the one or more prescribed periods prior to the expected departure time.

Thus if the control means is able to control charging of the energy storage means such that the energy storage means is charged substantially to the prescribed level only during the one or more prescribed periods the control means does so. However if there is insufficient time available before the expected departure time to charge only during the one or more prescribed periods the control means controls charging such that charging takes place for as long as possible during the one or more prescribed periods, the balance of charging being performed outside of such a period.

This feature has the advantage that a vehicle operator may take full advantage of reduced energy tariffs whilst at the same time ensuring that the state of charge of the energy storage means is sufficient for the next journey.

Advantageously the control means may be operable to receive an input corresponding to an expected departure time of the vehicle from an operator of the vehicle.

Advantageously the control means may be operable to receive the input corresponding to expected departure time by means of input means, the input means optionally being one selected from amongst a control button and a touch-screen.

The control means may be operable to determine an expected departure time responsive to historical data in respect of vehicle departure times, optionally vehicle departure times from a given location, further optionally vehicle departure times as a function of day of the week.

The control means may be operable to allow a user manually to override the controller, such that when the location of the vehicle corresponds to a prescribed location the controller performs charging during a non-prescribed period of the day.

In a further aspect of the invention for which protection is sought there is provided a motor vehicle comprising control means according to the preceding aspect.

In a still further aspect of the invention for which protection is sought there is provided a method of controlling by control means charging of energy storage means of a vehicle for storing energy to power one or more electric propulsion motors, the method comprising:

determining by the control means whether a location of the vehicle corresponds to a prescribed location;

if the location of the vehicle does correspond to one or more prescribed locations, the method comprising performing by means of the control means charging of the storage means during one or more prescribed periods of the day.

In a further aspect of the invention for which protection is sought there is provided control means for a vehicle having energy storage means for storing energy to power one or more electric propulsion motors of the vehicle, the control means being configured to allow charging of the energy storage means in dependence on a location of the vehicle and a current value of an electricity tariff, wherein if the location of the vehicle corresponds to one or more prescribed locations the control means is operable to perform charging during one or more periods for which the current value of electricity tariff corresponds to a prescribed one or more values.

The prescribed one or more values of electricity tariff may correspond to an off-peak tariff.

In some embodiments a vehicle is provided that may be considered automatically to select to charge the vehicle during a period of the day corresponding to an off-peak tariff in respect of the cost of electricity.

In an aspect of the invention for which protection is sought there is provided control means for a vehicle having energy storage means for storing energy to power one or more electric propulsion motors of the vehicle, the control means being configured to allow charging of the energy storage means in dependence on a current value of an electricity tariff, wherein the control means is operable to permit charging only during one or more periods for which the current value of electricity tariff corresponds to a prescribed one or more values.

Advantageously the control means may be operable to allow charging of the energy storage means in further dependence on a location of the vehicle, the control means being operable to allow charging in dependence on the current value of electricity tariff if the location of the vehicle corresponds to one or more prescribed locations.

Within the scope of this application it is envisaged that the various aspects, embodiments, examples and alternatives set out in the preceding paragraphs, in the claims and/or in the following description and drawings, and in particular the individual features thereof, may be taken independently or in any combination. Features described with reference to one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
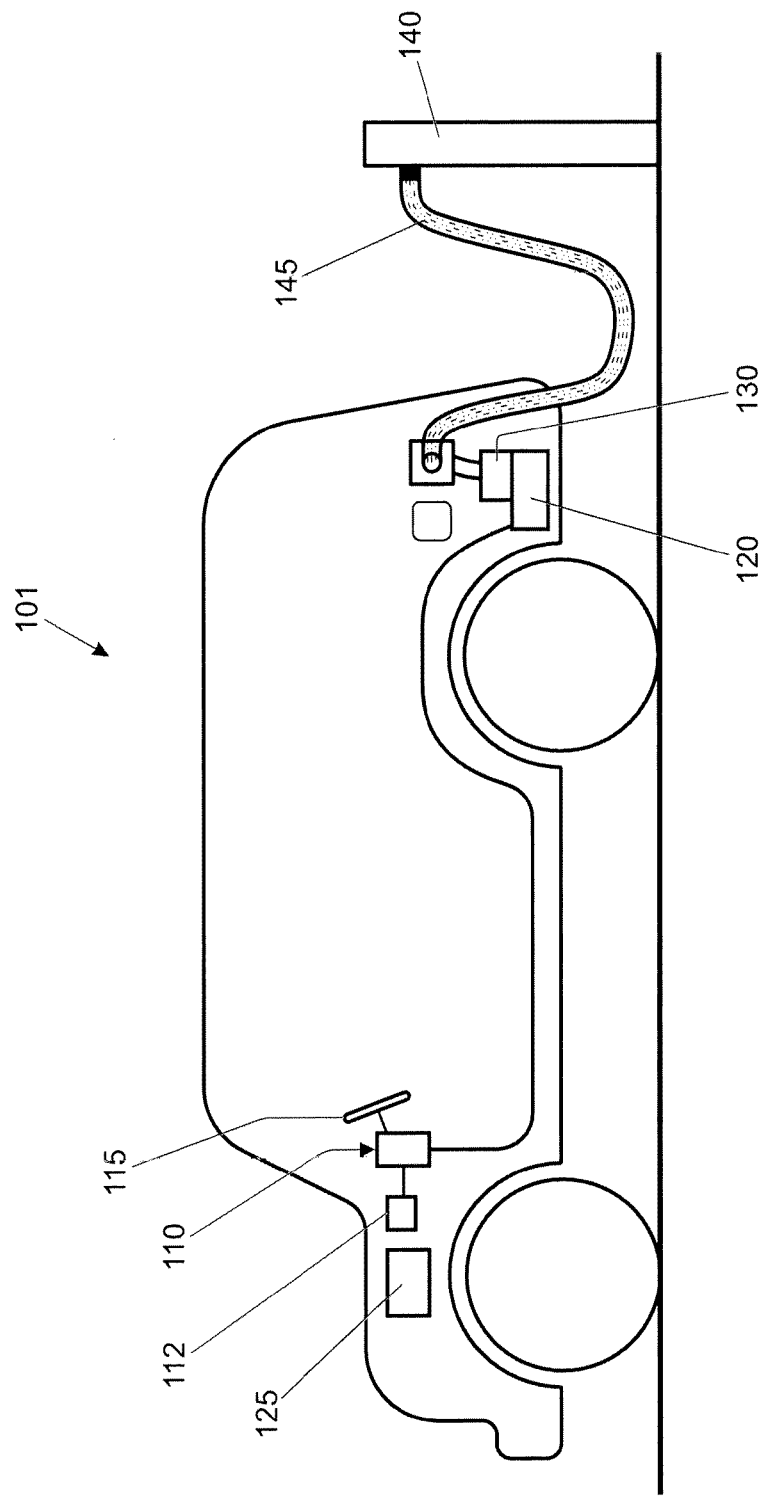
FIG. 1 shows a plug-in hybrid electric vehicle (PHEV) according to an embodiment of the invention connected to a recharging station.

FIG. 1 shows a PHEV 101 according to an embodiment of the invention connected to a recharging station 140 by means of a cable 145. The vehicle 101 has a charge controller 130 that controls charging of a battery 120 of the vehicle 101 when the vehicle 101 is connected to a charging station 140. The battery 120 stores charge for powering an electric propulsion motor 125.

The vehicle has a central controller 110 that is operable to provide an over-ride control signal to the charge controller 130. If the central controller 110 provides the over-ride control signal to the charge controller 130 the charge controller 130 inhibits charging of the battery 120 even when the vehicle 101 is connected to a charging station 140.

In the embodiment of FIG. 1 the central controller 110 is operable to request a user to input data in respect of one or more prescribed locations of the vehicle 101 at which charging of the battery 120 is to be limited to one or more prescribed periods of the day. In other words, when the vehicle is at a prescribed location, charging of the battery 120 is to be permitted only during one or more prescribed periods of time. The central controller 110 is arranged to provide a graphical user interface (GUI) to a user via a touch screen 115 in order to allow this data to be entered.

Thus the user (such as a driver) may be invited to input data to the controller 110 via the touch screen 115 corresponding to (1) one or more locations at which charging of the battery 120 is to be limited to one or more prescribed periods of the day, and (2) one or more periods of a day when charging is to be permitted.

The user may therefore input to the controller 110 data identifying the one or more periods of time during a day for which the cost of electrical power (i.e. the electricity tariff) is reduced or at a minimum. These are the periods during which charging of the battery is to be permitted. The central controller 110 stores data corresponding to the one or more prescribed locations and the one or more prescribed periods in a memory thereof.

In use, if the vehicle 101 is connected to a charging station 140 at one of the one or more prescribed locations, the central controller 110 inhibits charging of the battery 120 except during the one or more prescribed periods of time. During the one or more prescribed periods, the controller 110 does not over-ride charging of the battery 120.

In some embodiments, if the battery 120 is not fully charged when a prescribed charging period ends, the controller 110 provides an over-ride signal to the charge controller 130 and further charging of the battery 120 is suspended until the next prescribed period begins. In some embodiments however, the central controller 110 and/or charge controller 130 may be configured to permit charging to continue until the battery 120 is fully charged, once charging has been started. In some embodiments, the controller 110 may be operable to determine whether the battery 120 may be sufficiently charged during the next prescribed period. If the controller 110 determines that the battery 120 cannot be sufficiently charged during this period, the controller 110 may commence charging in advance of the prescribed period so as to enable the battery 120 to be charged sufficiently by the end of the prescribed period. Other arrangements are also useful.

It is to be understood that because reduced electricity tariffs are typically enjoyed at night, a typical prescribed location set by a user may be the home of the user since the vehicle 101 is likely to be parked at home overnight. The user will therefore enjoy the benefit of reduced vehicle running costs because charging of the battery 120 takes place at night when the electricity tariff is lower.

Figure 2:
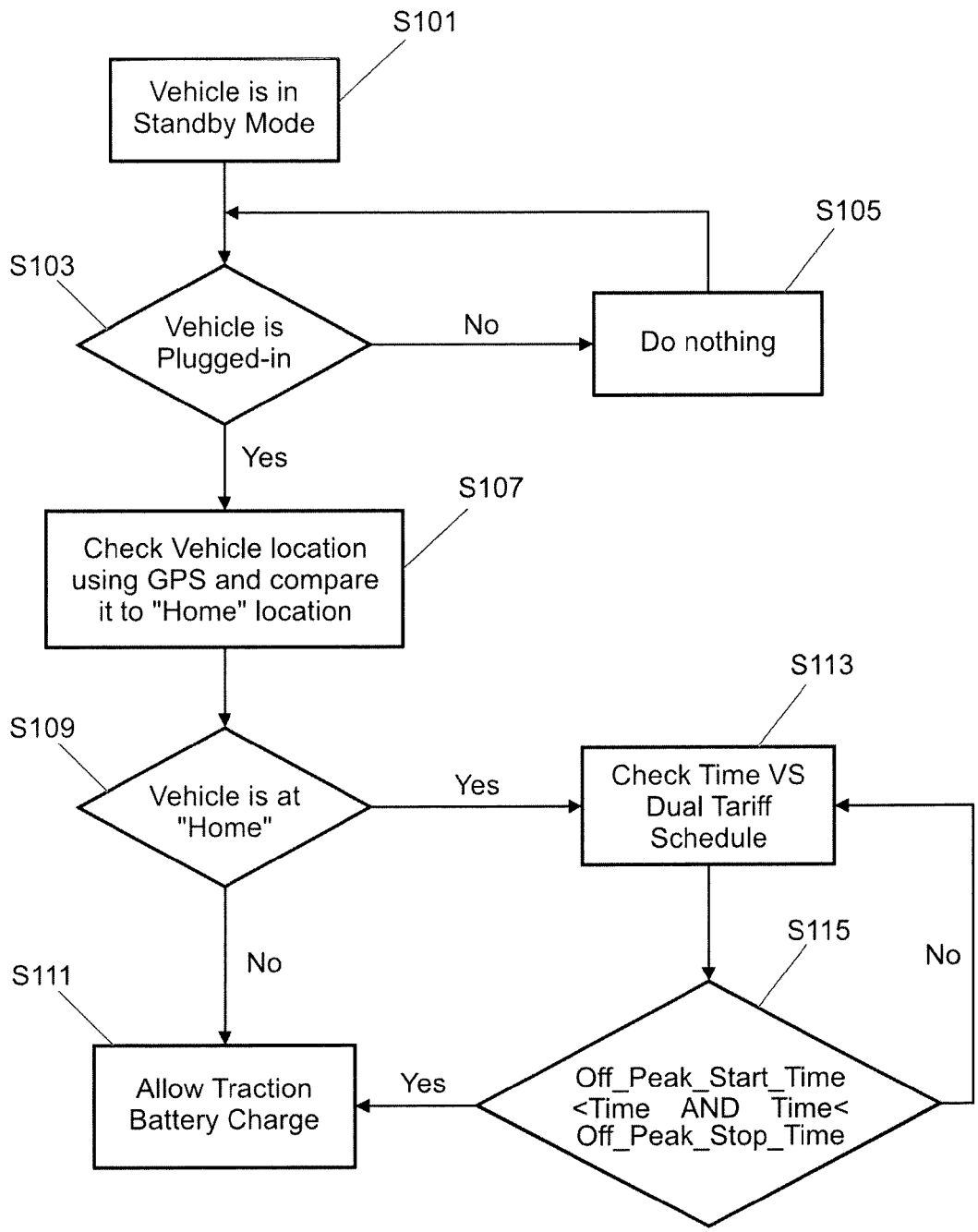
FIG. 2 is a flow chart illustrating a method of operation of a PHEV according to an embodiment of the invention.

FIG. 2 is a flow chart illustrating a method of operation of the PHEV 101 of the embodiment of FIG. 1. At step S101 the vehicle 101 is parked in a standby mode. At step S103 the central controller 110 determines whether the vehicle 101 is connected to a recharging station 140. If the vehicle 101 is not connected to a recharging station 140 then at step S105 no action is taken and the controller 110 continues to check whether the vehicle 101 is connected to a recharging station 140.

If at step S103 the controller 110 determines that the vehicle 101 is connected to a recharging station 140 the method continues to step S107. At step S107 the controller 110 checks the location of the vehicle 101 by reference to data received by the controller 110 from a location determination device 112. In the embodiment of FIG. 1 the location determination device 112 is a global satellite positioning system (GPS) device 112. Other location determination devices are also useful including devices that determine location using a cellular telecommunications network.

At step S109 the controller 110 determines whether the vehicle 101 is at a prescribed location an identity of which has been previously input to the controller 110 by a user. The prescribed location is a location for which charging of the battery 120 is to be limited to one or more prescribed periods of time of a day. If the controller 110 determines at step S109 that the vehicle 101 is not located at a prescribed location the method continues at step S111. At step S111 the controller 110 does not over-ride charging of the battery 120 by the charge controller 130.

At step S111 the charge controller 130 is configured to determine whether charging of the battery 120 is required based on the state of charge of the battery 120. If charging is required then the charge controller 130 commences charging of the battery 120. In some alternative embodiments the charge controller 130 determines whether charging of the battery 120 is required whilst the vehicle 101 is in standby mode at step S101, and only proceeds to step S107 if the vehicle 101 is connected to a recharging station 140 and charging of the battery 120 is required.

If at step S109 the controller 110 determines that the vehicle is located at a prescribed location for which charging is to be limited to one or more prescribed periods of time of day, the method continues to step S113. At step S113 the controller 110 determines whether the time of day corresponds to one or more prescribed periods of time set by a user. The prescribed periods are set by the user to correspond to periods of time for which the electricity tariff is reduced, i.e. 'off-peak' periods of time. Thus, if the current time is between an off peak tariff start time Off_Peak_Start_Time and an off-peak tariff end time Off_Peak_Stop_Time the method continues to step S111 at which charging of the battery 120 is permitted. However if the current time is not within the off-peak period the method continues to step S113.

In some embodiments the controller 110 is configured to access automatically a source of data in respect of one or more periods of a day for which a reduced tariff is payable for electrical power, and to use this information to determine the one or more prescribed periods.

The controller 110 may be configured to take into account days such as weekends and/or public holidays when the start and end times of one or more reduced tariff periods such as an off-peak tariff period may change.

In some embodiments the controller 110 may be arranged to access data by any other required method. In some embodiments the controller 110 may access data transmitted by a utility provider over a powerline. The data may for example indicate a current tariff for electricity drawn from the powerline. The controller 110 may be configured such that when the vehicle 101 is at one of the one or more prescribed locations, charging is permitted only for a selected one or more tariffs, or when a tariff is at or below a threshold value. Other arrangements are also useful.

In some embodiments the controller 110 is operable to allow a user to input an expected departure time of the vehicle being a time at which the next journey is expected to commence. Responsive to such an input the controller 110 may be arranged to ensure that the battery 120 is charged to a required value in advance of the expected departure time. The required value may correspond to a substantially fully charged battery 120. Alternatively or in addition, in some embodiments the controller 110 may be operable to allow a user to provide an indication of a state of charge they require the battery to achieve, such as 50%, 75%, 100% or any other suitable value. In some embodiments the controller 110 may be operable to allow a user to provide an indication of a range (or distance) that the vehicle may be required to be capable of traveling in order to make its next journey, the controller 110 being arranged to ensure that sufficient charge is available for the expected required range.

The controller 110 may be arranged to ensure that advantage is taken of any reduced tariff available during the period between the time at which the user connects the vehicle 101 to a charging source and the departure time itself. If no such reduced tariff is available in that period the controller 110 may be configured immediately to commence charging of the battery 120 in order to ensure that the battery 120 is charged to the required value. This has the advantage that if the departure time is brought forward, a risk that the battery 120 has insufficient charge for the journey may be reduced.

If a period of reduced tariff is available before the estimated departure time, the controller 110 is arranged to maximise the amount of time for which charging takes place during the period of reduced tariff. Thus if the amount of time for which charging is required to take place exceeds the length of the period of reduced tariff, the controller 110 is arranged to ensure that charging takes place throughout any one or more periods of reduced tariff prior to commencement of the journey and either to (1) commence starting of charging before a period of reduced tariff begins; (2) continue charging after a period of reduced tariff ends; or (3) commence charging before a period of reduced tariff begins and continue charging after the period of reduced tariff ends. Other arrangements are also useful.

Thus it is to be understood that the controller 110 may adjust a start and/or end time of a charging period with respect to a period of reduced tariff in order to ensure that a battery 120 is sufficiently charged before an expected departure time of a vehicle 101.

Embodiments of the invention have the advantage that user enjoyment of a vehicle may be enhanced by reducing a cost of ownership of a vehicle. Furthermore, because charging in off peak periods is favoured, an impact of increasing numbers of PEV and PHEV vehicles on an electricity supply network may be mitigated. Thus, by favouring off-peak periods, an amount of electricity demanded from the electricity supply network during peak periods when demand for power from businesses and industry is high is reduced. Accordingly, a need to upgrade the supply network in order to deliver increased electrical current to meet the combined demand may be reduced or substantially eliminated.

The invention includes embodiments in which a vehicle is charged using inductive coils, as well as to other methods of charging which do not require a plug.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a vehicle, the controller operable to control charging of at least one battery that powers one or more electric propulsion motors in dependence on a location of the vehicle and a time of day, wherein the controller is operable to receive data from a user indicative of one or more prescribed geographic locations corresponding to charging stations at which charging of the at least one battery is to be limited to one or more prescribed periods of the day and to determine if the location of the vehicle corresponds to the one or more prescribed geographic locations based on received wireless signals, and, if the location of the vehicle does correspond to the one or more prescribed geographic locations, the controller is operable to perform charging during the one or more prescribed periods of the day.

2. The controller of claim 1, wherein if the location of the vehicle does not correspond to one or more prescribed geographic locations, the controller is operable to perform charging irrespective of the time of day.

3. The controller of claim 1, operable to allow a user manually to input data corresponding to an identity of the one or more prescribed periods of the day when charging may be performed at the one or more prescribed geographic locations.

4. The controller of claim 1, operable to access data corresponding to an identity of the one or more prescribed periods of the day when charging may be performed at the one or more prescribed geographic locations.

5. The controller of claim 1, arranged to access data in respect of the one or more times of day during which charging may be performed via one selected from amongst a wireless internet connection, a mobile telecommunications network and a portable data storage device.

6. The controller of claim 1, arranged to receive data indicative of a location of the vehicle.

7. The controller of claim 1, comprising a location determination device operable to determine a location of the vehicle.

8. The controller of claim 1, operable to charge the at least one battery to a prescribed value of state of charge over one or more time periods determined responsive to data in respect of an expected departure time of the vehicle, the controller being configured to optimise charging to the prescribed value by charging the at least one battery for as long as possible during the one or more prescribed periods prior to the expected departure time.

9. The controller of claim 8, operable to receive an input corresponding to an expected departure time of the vehicle from an operator of the vehicle.

10. The controller of claim 9, operable to receive the input corresponding to expected departure time via an input device, the input device being one selected from amongst a control button and a touchscreen.

11. The controller of claim 8, operable to determine an expected departure time responsive to historical data in respect of vehicle departure times, vehicle departure times from a given location, and/or vehicle departure times as a function of day of the week.

12. The controller of claim 1, operable to allow a user manually to override the controller, such that when the location of the vehicle corresponds to a prescribed geographic location the controller performs charging during a non-prescribed period of the day.

13. A motor vehicle comprising the controller of claim 1.

14. An electric or hybrid electric vehicle comprising the controller of claim 1.

15. A method of controlling charging of at least one battery of a vehicle that powers one or more electric propulsion motors, the method comprising:
receiving data from a user indicative of one or more prescribed geographic locations corresponding to charging stations at which charging of the at least one battery is to be limited to one or more prescribed periods of the day;
determining whether a location of the vehicle corresponds to the one or more prescribed geographic locations based on received wireless signals; and
if the location of the vehicle does correspond to the one or more prescribed geographic locations, performing charging of the at least one battery during the one or more prescribed periods of the day.

16. The controller of claim 1, wherein if the location of the vehicle corresponds to the one or more prescribed geographic locations the controller is operable to perform charging during one or more periods for which a current value of an electricity tariff corresponds to a prescribed one or more values.

17. The controller of claim 16, wherein the prescribed one or more values of the electricity tariff corresponds to an off-peak tariff.

* * * * *